March 15, 1966 H. E. HALL, JR 3,240,938
RADIOACTIVITY WELL LOGGING FOR DETERMINING THE
PRESENCE OF HYDROGEN AND CHLORINE
Filed Oct. 14, 1960 6 Sheets-Sheet 1
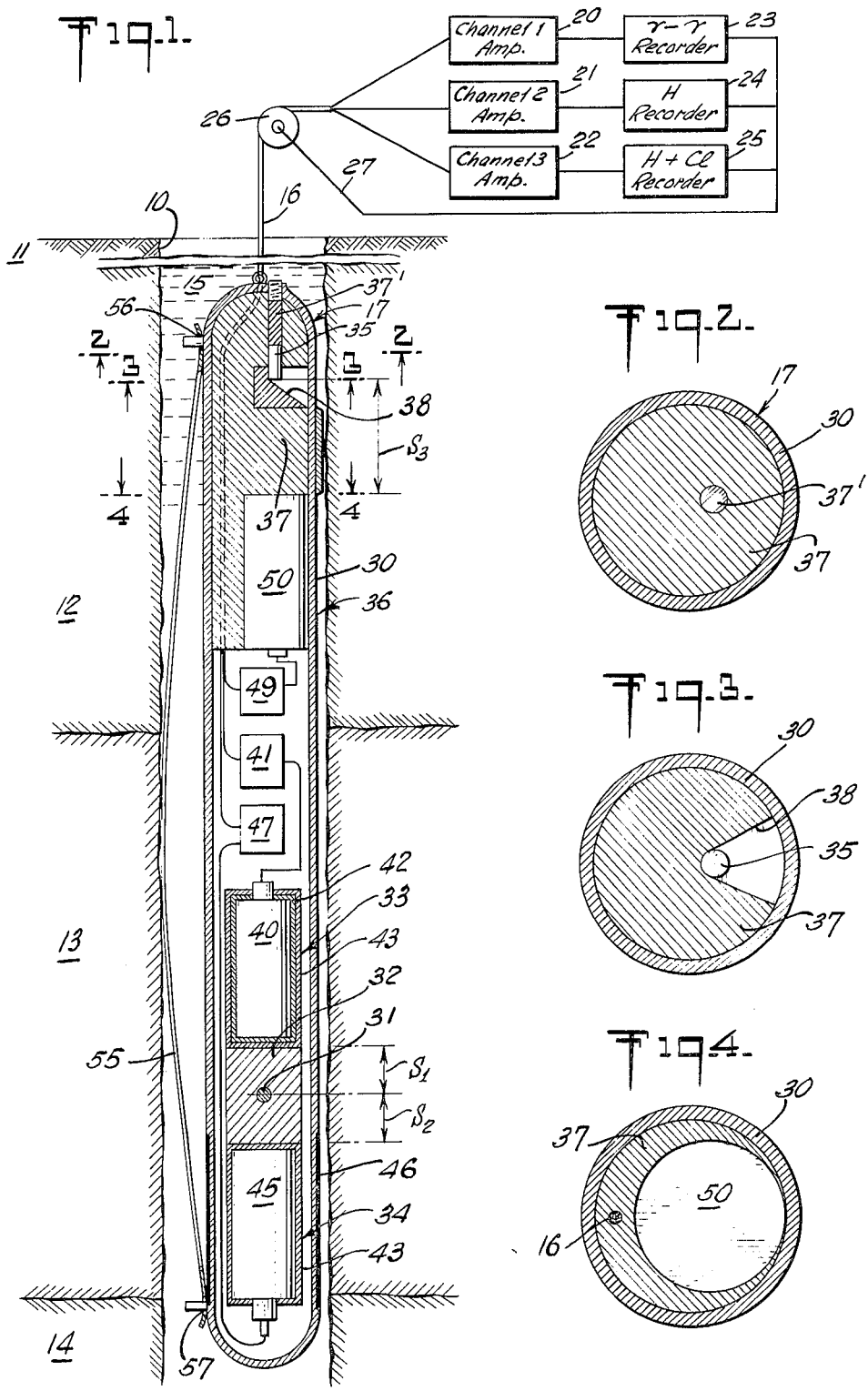

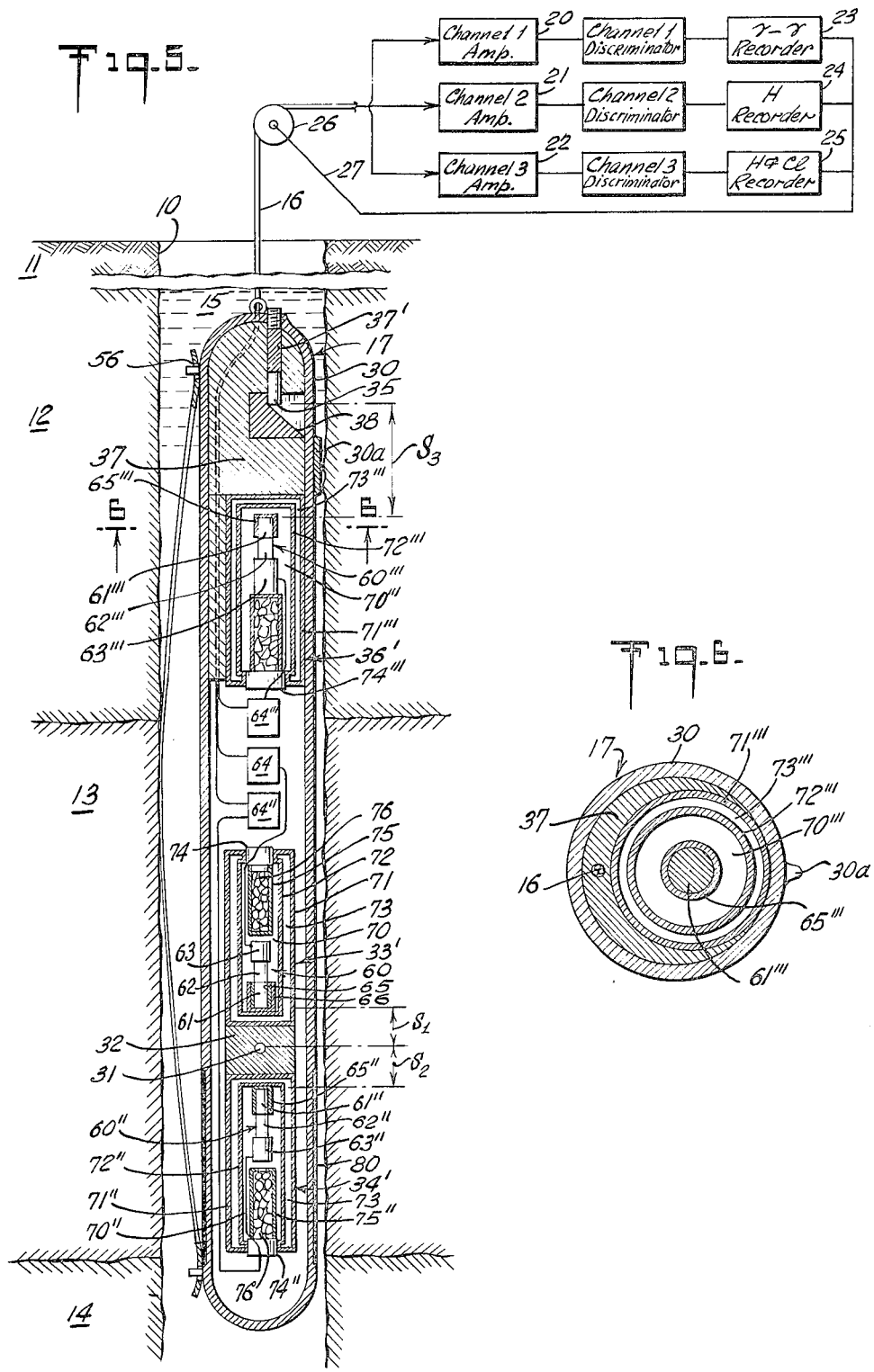

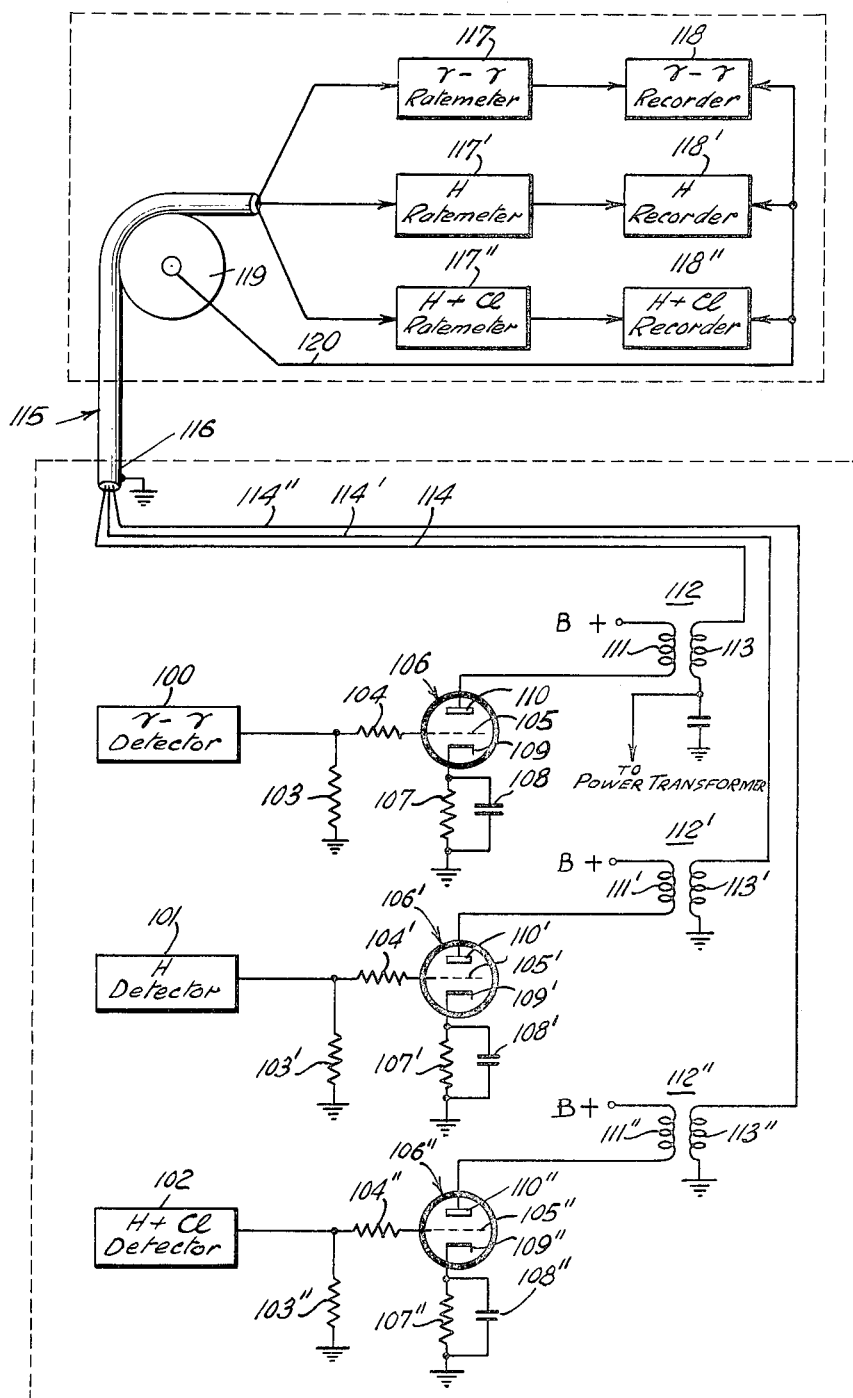

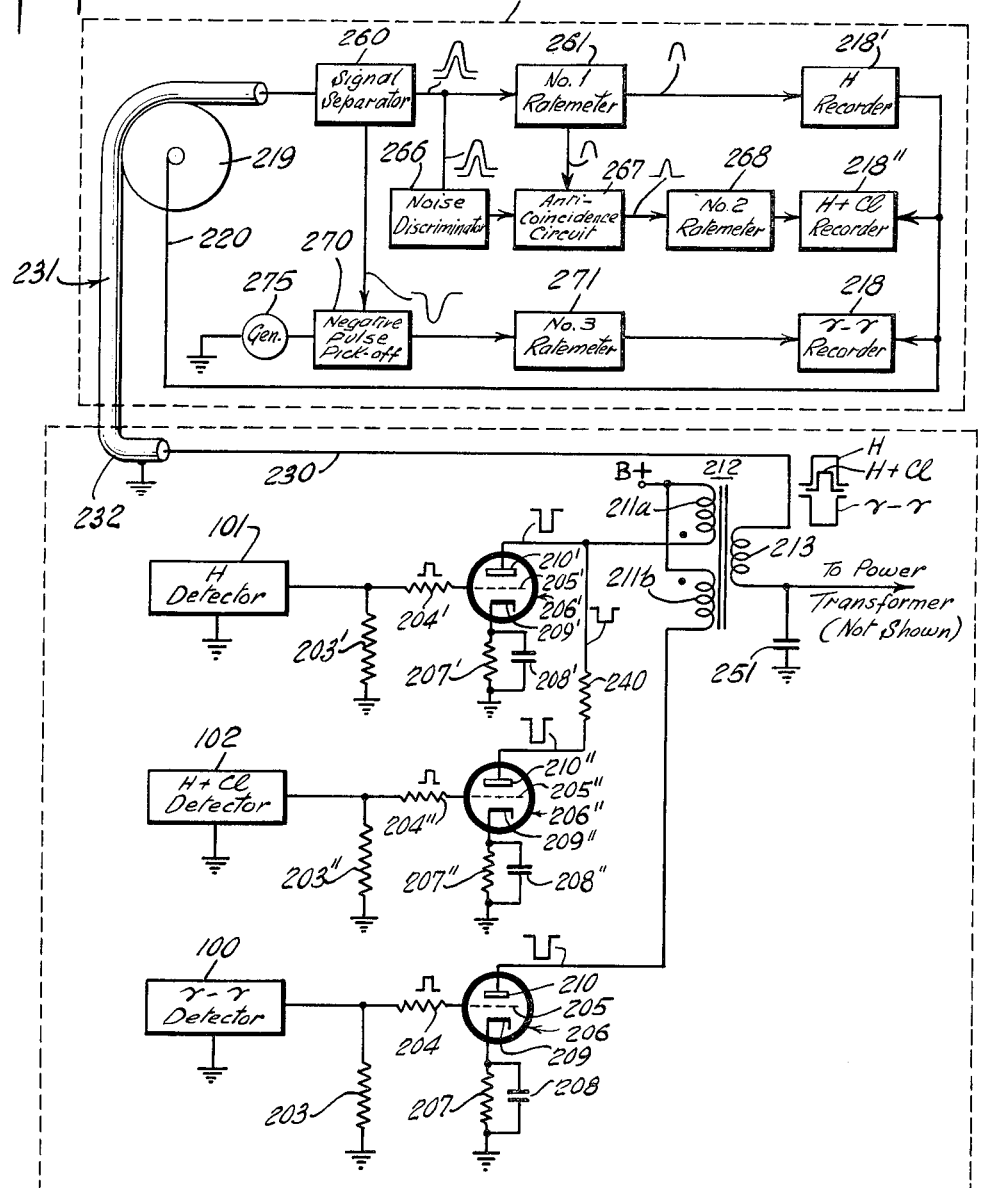
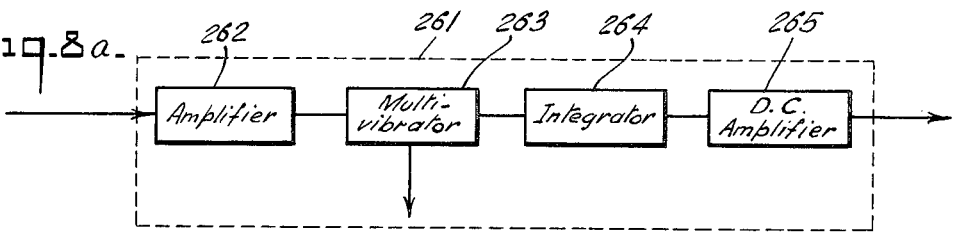

March 15, 1966 H. E. HALL, JR 3,240,938
RADIOACTIVITY WELL LOGGING FOR DETERMINING THE
PRESENCE OF HYDROGEN AND CHLORINE
Filed Oct. 14, 1960 6 Sheets-Sheet 5
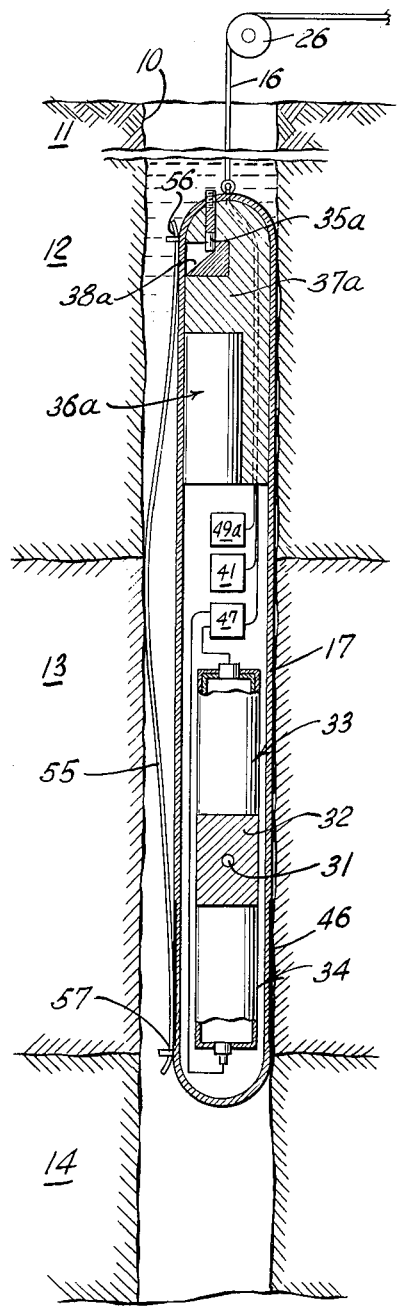
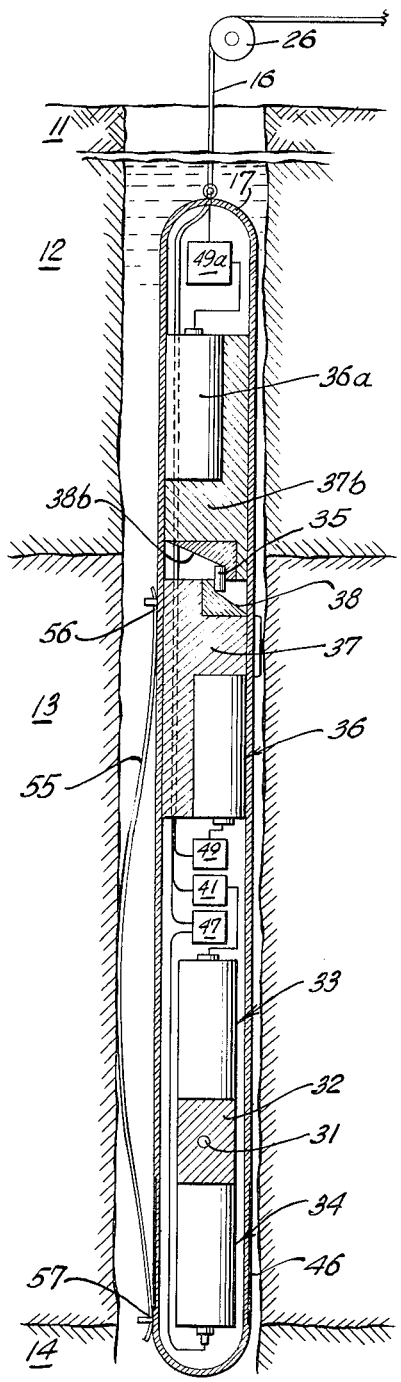

March 15, 1966 H. E. HALL, JR 3,240,938
RADIOACTIVITY WELL LOGGING FOR DETERMINING THE
PRESENCE OF HYDROGEN AND CHLORINE
Filed Oct. 14, 1960 6 Sheets-Sheet 6
Fig.11.
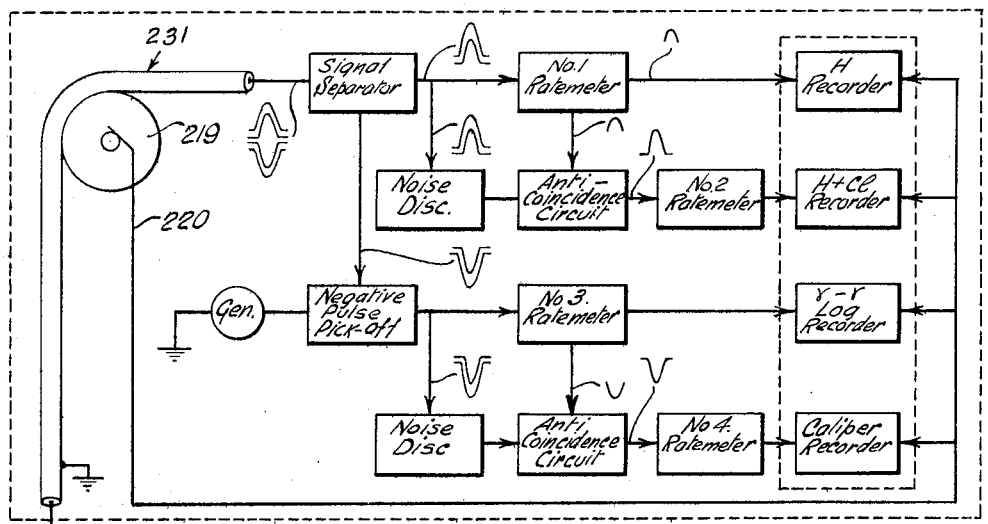
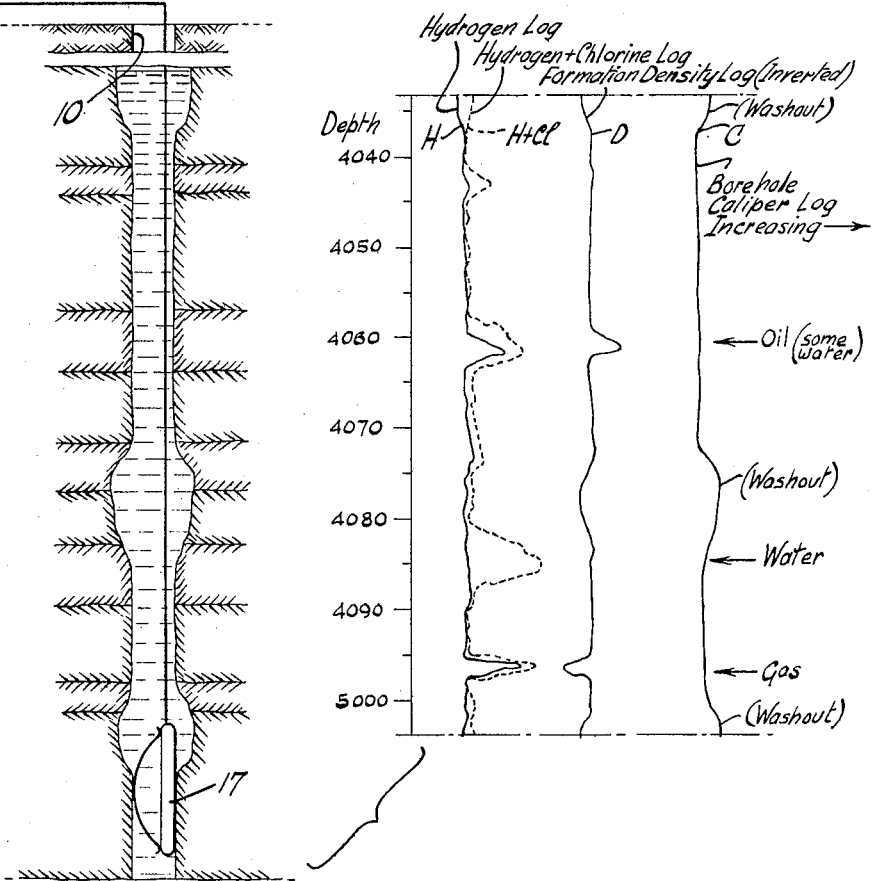

3,240,938
RADIOACTIVITY WELL LOGGING FOR DETERMINING THE PRESENCE OF HYDROGEN AND CHLORINE
Hugh E. Hall, Jr., Houston, Tex., assignor to Texaco Inc., New York, N.Y., a corporation of Delaware
Filed Oct. 14, 1960, Ser. No. 62,694
16 Claims. (Cl. 250—83.3)

The present invention relates generally to the determination of the nature of earth formations; and, more particularly, it is concerned with analysis of earth formations along the traverse of a bore hole through irradiation of the formations with penetrative radiations in order to cause certain observable effects which are detected as an indication of the nature of the formations. Accordingly, it is a general object of the present invention to provide improvements in radioactivity well logging wherein penetrative radiation is employed to cause observable effects indicative of the nature of the earth formations along the well bore.

It is well known to analyze earth formations in situ along the traverse of a bore hole through the use of various radioactivity analysis techniques. For example, it is possible to determine the presence of porous zones along the path of the bore hole through the use of scattered gamma ray, neutron-neutron, or neutron-gamma ray logs in accordance with known techniques. It has been suggested that a plurality of these logs may be conducted simultaneously by the use of a combination logging instrument to reduce the time required to conduct the logs. Such well logs are disclosed, for example, in U.S. Patent 2,345,119, issued on March 28, 1944 as the result of an application filed June 26, 1940 by D. G. C. Hare. See also U.S. Patent 2,648,780, issued on August 11, 1953 as the result of an application filed June 15, 1950 by G. Herzog. U.S. Patent 2,761,977, granted September 4, 1956 to A. S. McKay on an application filed March 28, 1952, also relates to combination logging.

The present invention is especially directed toward improvements in combination well logging for quantitatively determining in situ the presence of salt water, hydrocarbon oil or gas in earth formations traversed by a bore hole. Accordingly, it is a more particular object of the present invention to provide improvements in radioactivity well logging wherein the formations are irradiated to produce observable radiation effects which are detected and measured as an indication of the presence of salt water, oil or gas in the earth formations along the well bore.

It is still another object of the present invention to provide improved methods and apparatus for quantitatively distinguishing between salt water, hydrocarbon oil and gas contained in the pores of an earth formation traversed by a bore hole and which is relatively insensitive to the adverse effect of certain other interfering substances which may also be present in the earth formation.

It is still a further object of the present invention to provide improvements in electrical circuitry for transmitting the signal outputs of the detectors of combination logging instruments to the surface equipment.

Briefly stated, the present invention is concerned with improvements in radioactivity well logging wherein separate sources of neutrons and gamma radiation are passed through a bore hole to irradiate the formations traversed by the bore hole and wherein radiation resulting from the neutron irradiation indicative of both chlorine and hydrogen is detected in a first zone spaced from the neutron source to provide a first signal indicative of both chlorine and hydrogen and radiation primarily indicative of hydrogen to the substantial exclusion of chlorine is also detected and gamma radiation resulting from the gamma radiation source is detected in a third zone spaced from the gamma radiation source and from said first and second zones to provide a third signal primarily indicative of the density of the irradiated formations. The invention contemplates that the effect on the neutron-induced hydrogen signal due to any chlorine which may be present in the formation or bore hole is neutralized. The first and second zones are spaced sufficiently far from the gamma radiation source to avoid interference therefrom. Likewise, the third zone is spaced sufficiently far from the neutron source to avoid interference from radiation resulting therefrom. The three signals are recorded in correlation with the position of the logging instrument in the bore hole. The first and second signals are plotted in correlation with the position of the logging instrument in the bore hole in such manner that differences between the two signals provide a quantitative measure of the chlorine content of the formation and corresponding variations in the two signals provide a quantitative indication of the hydrogen content in the formation. The third or scattered gamma radiation signal provides a quantitative indication of the density of the formation. The correlated signals are interpreted to determine liquid and gas contents of the formation and to determine salt water and oil contents of the liquid.

A preferred aspect of the invention involves the use of improved apparatus for conducting such a method, which apparatus involves an elongated instrument housing suitable to be passed through a bore hole and containing separate neutron and gamma radiation sources spaced from one another along the principal or longitudinal axis of the instrument for irradiating the earth formations along the bore hole. Spaced a predetermined distance from the neutron source along the longitudinal axis of the instrument, there is provided a first radiation detection unit sensitive to radiation resulting from the neutron source comprising a gamma radiation detector having its active volume substantially surrounded by a thin layer of neutron reactive material, such as cadmium. A second detection unit is also provided in the instrument spaced a predetermined distance from the source. Surrounding the instrument housing in the vicinity of the second detector, there is provided a layer of material having a relatively high capture cross-section for neutrons and characterized by having a relatively insignificant attendant gamma ray response upon the capture of a thermal neutron. A third detection unit sensitive to gamma radiation scattered from the gamma ray source is also provided in the instrument and is spaced a predetermined distance from the gamma ray source. The first and second detectors are spaced sufficiently far from the gamma ray source to avoid substantial interference therefrom. Likewise, the third detector is spaced beyond the range of interfering radiation resulting from the neutron source. The electronic signal handling equipment for the detectors is advantageously located in the space between the neutron source and associated detectors and the gamma ray source and associated detectors. Means are further provided for maintaining the position of the logging instrument in relatively fixed relation against the side of the bore hole during the course of the logging run.

Preferably, in accordance with a further aspect of the invention, the electrical outputs of the three radiation detectors are transmitted to the surface by means of improved circuitry including a single conductor cable system having a common ground sheath and wherein the three signals are applied to the common circuit with two of the signals being of a first polarity, one of said two signals being of substantially different amplitude than the other, and wherein the third signal is of different polarity than said first two signals. Means are provided at the surface for separating the three signals according to amplitude and polarity so that they may be individually displayed and recorded. Advantageously, the system includes an isolating transformer in the logging instrument so that the three signals may be applied to the single conductor cable and electrical power may be simultaneously transmitted from the surface to the logging instrument in the bore hole for operating the detectors and electrical apparatus associated with the detectors in the logging instrument.

For additional objects and advantages and for a better understanding of the invention, attention is now directed to the following description and accompanying drawings. The features of the invention which are believed to be novel are particularly pointed out in the appended claims.

In the drawings:

FIGURE 1 is a schematic representation showing a vertical elevation through a portion of a bore hole having a well logging instrument suspended therein and which is constructed in accordance with principles of the invention;

FIGURE 2 illustrates a cross-sectional view through the lines 2—2 of the instrument shown in FIGURE 1;

FIGURE 3 illustrates a cross-sectional view through the lines 3—3 of the instrument shown in FIGURE 1;

FIGURE 4 illustrates a cross-sectional view through the lines 4—4 of the instrument shown in FIGURE 1;

FIGURE 5 is a schematic representation similar to FIGURE 1 showing another form of logging apparatus embodying principles of the invention;

FIGURE 6 illustrates a cross-sectional view through the lines 6—6 of the instrument shown in FIGURE 5;

FIGURE 7 is a schematic representation, partly in block form, showing electrical circuitry which may be employed in the logging apparatus of FIGURES 1 and 5;

FIGURE 8 is a schematic representation, partly in block form, showing another embodiment of electrical circuitry which may be employed in the apparatus of FIGURES 1 and 5;

FIGURE 8a is a schematic representation in block form showing in greater detail a portion of the circuitry shown in FIGURE 8;

FIGURE 9 is a schematic representation of another form of logging instrument embodying features of the invention;

FIGURE 10 is a schematic representation of still another form of logging instrument embodying further features of the invention; and FIGURE 11 is a diagrammatic representation of a logging system incorporating principles of the present invention and which includes a vertical elevation, partly in cross section, showing a logging instrument in a bore hole through a series of earth formations and having plotted alongside the formations a typical logging record which may be made in accordance with the teachings of the present invention.

Referring now to FIG. 1 of the drawings, there is shown a bore hole 10 traversing a plurality of earth formations 11, 12, 13 and 14. The bore hole 10 is shown containing a fluid 15 such as water, crude oil, or drilling fluid, for example. Suspended within the bore hole 10, as by means of a cable 16, there is shown a well logging instrument 17 constructed in accordance with principles of the invention for deriving hydrogen plus chlorine content, hydrogen content and density signals as hereinafter described. The cable 16 may include an outer conductive sheath together with one or more additional inner conductors (not individually shown) in order to afford means for transmitting electrical signals between the instrument 17 and electrical apparatus at the surface of the earth. The surface equipment provides means for receiving signals transmitted from the logging instrument 16 and amplifying and segregating the received signals as necessary for recording purposes. The surface apparatus includes a separate amplifier 20, 21, 22 for each of the signal channels representing the outputs from the first, second and third detectors in the logging instrument. The respective outputs of each of the amplifiers 20, 21, 22 is, in turn, coupled to a respective recorder 23, 24, 25 for providing a signal display of the intensity, i.e. rate-of-occurrence of detected radiation. It is to be understood that each recorder may include appropriate pulse shaping and rate meter circuitry as necessary or desirable for providing the desired record. It is also to be understood that the recorders for the respective signal channels may actually be included in a single recording instrument having provision for multi-trace recording.

Although not specifically illustrated in FIG. 1, it is to be understood that an appropriate power supply is to be provided for the instrument. As is well known in the art, the power supply equipment or apparatus may involve the transmission of electrical power as alternating current from the surface to the logging equipment where appropriate means are provided for transforming the alternating current to voltages and rectifying the alternating current to provide the required direct current for operating the detection equipment and electrical circuitry associated therewith. It is also to be understood that it is within the contemplation of the invention to provide batteries in the logging instrument as a source of power, where their use is feasible.

In order to correlate the position of the logging instrument 17 in the bore hole 10 during the well log, there is provided at the surface a measuring apparatus 26, represented diagrammatically as a wheel having its perimeter in contact with the cable 16, for sensing movements of the cable 16 in and out of the bore hole 10. The measuring apparatus 26 may be any known device of this type suitable for determining the position of the logging instrument 17 in the bore hole 10 and may advantageously be of the type which provides an electrical output signal which may be transmitted as by means of the conductive circuit 27 to the recorders 23, 24, 25 for correlating the recorded logging signal with the position of the logging instrument 17 in the bore hole 10 throughout the well log.

The logging instrument 17 comprises an elongated outer shell-like housing or casing 30 formed conventionally of steel in accordance with known techniques to withstand the pressures and temperatures commonly encountered in the well logging art. Advantageously, the housing should be of such character as to withstand the conditions that may be found in bore holes upwards of ten or twenty thousand feet in depth.

The casing 30 contains a neutron source 31 for bombarding the earth formations along the bore hole together with appropriate radiation detection equipment for detecting gamma rays induced in the formation as the result of irradiation by the source. Appropriate electrical circuitry is also enclosed within the casing for amplifying and otherwise handling the output signals from the radiation detection equipment for transmission over the cable 16 to the surface equipment. In particular, the neutron source 31 is shown positioned within the housing 30 and surrounded by a neutron-permeable shield 32 of lead or tungsten, for example, to prevent gamma radiation which may also be emitted thereby from passing either directly or indirectly to the detection equipment. Within the casing 30, spaced a predetermined distance from the source 31, there is positioned a first radiation detection unit 33 which together with its associated circuitry is adapted and arranged to provide an output signal that is proportional to gamma radiation emitted from the adjacent earth formations as the result of interaction of neutrons from the source with hydrogen in the formation, while being substantially unaffected by the presence of chlorine in the formation, as discussed in detail below. The first detection unit 33 is hereinafter referred to as the porosity detector or simply the hydrogen detector. Below the neutron source 31, and spaced therefrom a predetermined distance, there is provided a second detection unit 34 which together with its associate circuitry is adapted and arranged to provide an output signal which is proportional to gamma radiation emitted from the formation as the result of neutrons from the source 31 and which gamma radiation is proportional to both the hydrogen and chlorine content of the formations. For purposes of convenience, the second detection unit 34 is hereinafter referred to as the hydrogen plus chlorine or simply the H+Cl detector.

The upper portion of the casing 30 contains a gamma radiation source 35 for irradiating the formations with gamma radiation along with a detector unit 36 sensitive to gamma rays returning to the bore hole due to the irradiation by the gamma ray source 35 and a shield 37 for preventing gamma radiation from passing directly from the source 35 to the detector 36. The shield 37 substantially surrounds the source 35, except for a collimating slot 38 for directing gamma radiation into the adjacent formation 10 while minimizing the emission of radiation in other directions. Appropriate electrical circuitry is also enclosed within the casing in the space below the gamma ray detector for amplifying and otherwise handling the output signals from the gamma radiation detection equipment for transmission over the cable 16 to the surface equipment.

The neutron source 31 may be of known type including those comprising an alpha ray emitter and a target material which emits neutrons in response to the alpha rays. For example, the alpha emitter may include radium, polonium, radium D, Actinium 227 or plutonium and the target may include beryllium.

The gamma ray source 35 may be of known type such as radium or cobalt 60, for example. The gamma ray shield 37 may be formed of lead or tungsten or preferably it may be formed of a high density machineable tungsten alloy such as that marketed as "Mallory 1000." The shield 37 may conveniently be formed of separate pieces of shielding material as shown in the drawing in order to simplify machining thereof. Preferably, the gamma ray source 35 is positioned relatively close to the sensitive side of the logging instrument facing toward the formation to be logged, as shown in the drawing, in order to permit increased shielding behind the source to the rear of the collimating slot 38.

The first, second and third radiation detector units 33, 34, 36 shown in the instrument of FIG. 1 include gamma radiation detector devices which are preferably and advantageously geiger type counters of the pulse producing type such as those described in U.S. Patent 2,397,071—Hare, hereinafter referred to as Hare type counters. These detectors are characterized by relatively high efficiency for the detection of gamma radiation and include in their structure multiple plate cathode elements.

The first or hydrogen detector unit 33 includes a gamma radiation detector 40 of the pulse counter type shown electrically connected to associated electrical equipment identified as an amplifier 41 for the transmission of an output signal to the surface equipment by means of the cable 16. It is to be understood that the detector 40 is energized by a high voltage source (not shown) which as mentioned above may comprise batteries or more conventionally may involve the use of power supply equipment including a transformer and rectifier for deriving appropriate high direct-current operating potential from electric power transmitted from the surface to the logging instrument in the bore hole. It is to be further understood that the amplifier 41 may actually include any additional circuitry required for transmitting signal information to the surface in accordance with principles well well known in the art. For example, the radiation detector signals may be transmitted to the surface equipment as amplitude modulated signals or may be transmitted as frequency modulated signals in accordance with well-known techniques.

Surrounding the first or hydrogen detector 40 there is provided a thin layer 42 of a neutron absorbing material such as cadmium which emits a plurality of gamma radiations upon capturing a neutron and which as hereinafter discussed functions in combination with other elements of the invention to render the neutron-gamma ray signal derived by the hydrogen detector unit 33 primarily sensitive to hydrogen and relatively insensitive to the effect of chlorine which may be present in the formation, as discussed in greater detail below. Surrounding both the hydrogen counter or detector 40 and the cadmium layer or sleeve 42 there is provided a lead sleeve or shield 43 for shielding unwanted lower energy gamma radiation from the detector 40. It has been determined that the lead shield 43 should comprise about ¼" of lead or equivalent gamma ray shielding material when a radium-beryllium source is employed.

In accordance with the so-called neutron-gamma ray logs, a source of neutrons is passed through the bore hole in order to irradiate the earth formations along the traverse of the bore hole. The neutrons from the source are slowed down in the formation and bore hole fluid, primarily due to the effect of hydrogen, and after being slowed to the thermal range the neutrons are captured by material of the formation with the resultant emission of gamma rays. These neutron-gamma rays are detected and their intensity, i.e. rate-of-occurrence is determined as a measure of the hydrogen content of the formations.

When the thermalized neutrons are captured by hydrogen, gamma rays having a characteristic energy of 2.2 million electron volts are emitted by the hydrogen responsible for the capture. When only hydrogen is present in the pores of the region under investigation, the intensity, i.e. rate-of-occurrence of the detected gamma radiation provides a good quantitative indication of the hydrogen content of the formation. However, it has been determined that other materials which may also be present in the formation can have an adverse effect on the neutron-gamma ray well log and which may render the log unreliable as a hydrogen measurement. Of particular significance is the presence of chlorine which has a relatively high capture cross-section for thermal neutrons, as compared with that of hydrogen. In particular, chlorine has a neutron capture cross-section of about 32 barns, whereas hydrogen has a neutron capture cross-section of about .33 barns. Thus, chlorine is approximately 100 times more effective in capturing thermal neutrons than hydrogen. When a thermal neutron is captured by chlorine, rather than hydrogen, about 3.1 gamma rays (on the average) are emitted per capture as compared with one gamma ray per capture by a hydrogen atom. In addition to the foregoing, many of the gamma rays emitted by chlorine are of higher energy range, from about 4–8 mev., than the characteristic 2.2 mev. gamma rays of capture emitted by hydrogen. In view of the foregoing the presence of even a small amount of chlorine will ordinarily increase the intensity of the gamma radiation detected by the neutron-gamma ray instrument, thus giving a false indication of hydrogen content in the resultant log.

The neutralization of the adverse effect of chlorine upon the neutron gamma ray well log described above is accomplished by subjecting the gamma ray detector to radiation which varies inversely with the effect upon the detector due to the presence of chlorine. Chlorine has a relatively high capture cross-section and emits a plurality of gamma rays in response to the capture of each neutron. Thus, the counting rate of the gamma ray detector is increased due to the presence of chlorine. In order to neutralize the effect of chlorine a gamma ray signal is developed whose intensity decreases correspondingly due to the presence of chlorine. This may be accomplished by developing a gamma ray signal whose intensity is proportional to the thermal neutron flux in the vicinity of the detector. This is due to the fact that chlorine absorbs or removes thermal neutrons from the environment of the detector due to its relatively high capture cross-section. Thus, the thermal neutron flux in the vicinity of the detector is reduced due to the presence of chlorine. By introducing a neutron-absorbing material, such as cadmium layer 42 around the detector 40, which emits a plurality of neutron capture gamma radiations in the vicinity of the detector, thermal neutrons are absorbed in said material which result in the emission of gamma radiation which is detected by the gamma ray detector. Using a geiger type detector, as described above, the thickness of cadmium needs to be at least enough to absorb most of the thermal neutrons. When the logging instrument passes into a region containing chlorine from an identical region with the exception that no chlorine is present, the counting rate of the gamma ray detector tends to increase due to the increase of the number of capture gamma rays directly attributable to the chlorine. However, when this occurs, the number of thermal neutrons available for capture by the neutron absorbing material around the detector is reduced thus tending to decrease the counting rate in the gamma ray detector. By suitable means, these two effects may be made to cancel one another, so that when a logging tool using this system is passed from a formation containing chlorine to one not containing chlorine but having the same porosity, formation matrix, and hydrogen content, the response remains constant.

In the apparatus shown in FIG. 1, the above-mentioned two effects may be made equal and opposite by adjustment of the amount of the neutron absorbing material 42.

While cadmium is preferred as the material for capturing the thermal neutrons in the vicinity of the detector in order to neutralize the effect of chlorine upon the neutron gamma ray log, it is to be understood that other materials may be employed rather than cadmium and that other materials may be employed together with cadmium. In the present case, where the cadmium is employed in a logging instrument having a steel instrument casing or housing, the iron of the logging instrument actually cooperates with the cadmium. Iron has a much lower capture cross-section for neutrons than cadmium; however, there is a relatively large quantity of iron present in the vicinity of the detector, hence, its effect is similar to that of the cadmium. Iron has a thermal neutron capture cross-section of 2.43 barns compared with a capture cross-section of about 3500 barns for cadmium. Iron emits neutron capture gamma rays ranging up to 9.3 mev., whereas cadmium emits gammas up to 9.05 mev. upon capture of thermal neutrons. Gadolinium may also be employed in carrying out the invention. Gadolinium has a capture cross-section of 36,300 barns and emits neutron capture gammas up to 7.78 mev. As mentioned above, chlorine, the effect of which is to be balanced out of the resultant detected gamma ray signal, has a capture cross-section of about 32 barns and produces neutron capture gamma rays up to about 8.56 mev.

Whether cadmium or other material having similar characteristics or a combination of such materials is employed, such as the combination of cadmium with the steel logging casing, it is important that the sum total of such material used have a predetermined net effect which results in the development of a gamma ray signal in response to the thermal neutron population in the immediate vicinity of the detector which just cancels out the capture gamma effect due to the presence of chlorine in the bore hole and formation in the vicinity of the detector.

The lower or hydrogen plus chlorine detector unit 34 is substantially like the upper or hydrogen detector unit 33 and similar elements bear corresponding reference numerals having a primed designation. However, the H+Cl detector unit 34 is not made insensitive to chlorine as in the case of the hydrogen detector unit 33, instead, its sensitivity to chlorine is enhanced. In particular, the H+Cl detector unit 34 differs from the detector unit 33 of the hydrogen detector in that it includes a gamma radiation detector 45 which is not provided with a surrounding layer of cadmium. The H+Cl detector further differs from the hydrogen detector unit 33 in that the portion of the logging housing or casing 30 in the vicinity of the detector 45 is surrounded with a layer 46 of material having a relatively high thermal neutron capture cross-section and which is further characterized in that it has relatively insignificant high energy gamma ray emission characteristics in response to the capture of a thermal neutron. Advantageously, this material comprises boron or a boron compound in admixture with a suitable binder. One embodiment of the invention, as illustrated in FIG. 1, involves the use of a layer 46 of boron carbide admixed with an epoxy resin binder.

It is to be understood that the gamma radiation detected by the H+Cl detector unit 34 varies as a function of the hydrogen content of the formation as well as the chlorine content. Fast neutrons from the source 31 must be moderated, i.e., slowed to the thermal range, before being captured to cause emission of neutron induced gamma rays. The hydrogen sensitivity of the H+Cl detector 34 is due to the fact that the hydrogen, which is the lightest of the elements, is primarily responsible for moderating or thermalizing the fast neutrons from the source. The chlorine sensitivity of the detector is due to the fact that the measured gamma ray flux is emitted primarily due to capture of the thermal neutron by chlorine.

The scattered gamma ray apparatus provides means for determining the density of the formations along the traverse of the bore hole and the signal output of the scattered gamma ray detector unit 36 is employed in correlation with the two signals from the neutron-gamma ray equipment, as hereinafter discussed, in order to determine quantitatively the oil-gas-salt water contents of the earth formations along the bore hole.

Preferably, the cathodes of the Hare type neutron-gamma detectors should be formed of relatively low atomic number material whereby it is primarily sensitive to the higher energy induced gamma rays. Likewise, the cathode of the scattered gamma detector should be formed of higher atomic number materials whereby the detector is preferentially sensitive to the lower energy scattered gamma rays. Preferred materials for the scattered gamma ray detector include tantalum and tungsten. Preferred material for the induced gamma ray detectors includes stainless steel.

Advantageously, the scattered gamma radiation equipment is located in the upper portion of the logging instrument and is separated from the neutron-gamma equipment by the instrument electronics. Preferably the scattered gamma radiation unit 36 includes a detector 50 which is positioned relatively close to the sensitive face or side of the logging instrument, i.e. the side thereof maintained against the side of the bore hole, in order to permit the use of a gamma ray shield 51 on the back of the detector 50 between the detector and the wall of the housing or casing facing the distant side of the bore hole for minimizing the detection of any scattered gamma radiation which may pass through the bore hole rather than the earth formation.

As mentioned above, the respective neutron-gamma ray detector units 33, 34 are spaced from the scattered gamma ray detector unit 36 sufficient distance to assure that the scattered gamma ray detector 50 is substantially unaffected by the radiation resulting from the neutron source 31 and likewise the neutron-gamma ray detectors 40, 45 are spaced sufficiently from the gamma radiation source 35 to avoid interference therefrom. In a typical liquid filled bore hole it has been determined that each detector should advantageously be at least 6 feet away from the source from which interference is to be avoided. The electronic equipment for the respective detectors is preferably positioned intermediate the neutron-gamma ray equipment and the scattered gamma ray equipment in the logging instrument, as shown, in order to provide for optimum utilization of space within the logging instrument consistent with maximum spacing between each of the radiation sources and the respective detector whose radiation is to be avoided.

In order to stabilize the position of the logging instrument 17 throughout the logging run, there is provided a decentralizing bow spring 55 having its upper and lower ends 56 and 57 mounted to the logging instrument 17 in such manner that the spring is free to flex as the instrument is moved past irregularities in the side of the bore hole. This may be achieved by mounting the upper and lower ends of the bow spring 55 in slidably engageable relationship to the instrument 17, as by means of elongated slots (not shown) in the bow spring 45.

Referring now to FIGURE 5, there is shown another embodiment of the invention wherein the three (3) gamma ray detector devices of the respective detector units 33', 34', 36' are of the scintillation type, rather than the geiger type as in FIG. 1. In particular, the first or H neutron-gamma detector unit comprises a scintillation detector 60 including a gamma ray sensitive luminophor 61, advantageously in the form of a thallium activated sodium iodide crystal, together with a photomultipler tube 62 shown mounted adjacent the luminophor 61 for detecting the photon output pulses from the luminophor 61 and providing an electrical signal proportional thereto. The photomultiplier tube 62 is shown adjacent a preamplifier 63 which, in turn, is shown electrically connected to additional electrical equipment identified as an amplifier 64 for transmission of an output signal derived from the photomultiplier tube 62 to the surface equipment by means of the cable 16. It is to be understood that the photomultiplier tube 62 is energized by means of a high voltage source (not shown) which may comprise batteries positioned in the logging instrument 17 or, more conventionally, may involve the use of power supply equipment including a transformer and rectifier in the logging instrument for deriving appropriate high direct current operating potential from electric power transmitted as alternating current from the surface to the logging instrument 17 in the bore hole. It is to be further understood that the amplifier 64 may actually include any additional circuitry required for handling the transmission of the signal information to the surface in accordance with principles well known in the art. For example, the radiation detector signals may be transmitted to the surface as amplitude modulated signals, or may be transmitted in the form of frequency modulated signals, in accordance with well-known techniques. If a so-called single conductor cable is employed, the respective signals from the separate detectors may be transmitted simultaneously as pulses of different polarity or as signal information on carriers of different frequency, for example. The luminophor 61 is shown mounted within a conventional aluminum container 65 which serves to protect it from moisture and physical damage. The upper end of the container 65 facing the photomultiplier 62 is also shown as open, with the luminophor 61 in direct contact with the photomultiplier 62. However, it is to be understood that the container 65 may be sealed with a transparent cover of glass or plastic in a manner known in the art. Surrounding the container 65 there is provided a thin layer 66 of a neutron absorbing material, such as cadmium, which emits a plurality of gamma radiations upon capturing a neutron and which, as herein discussed, functions in combination with other elements of the invention to render the signal derived by the neutron-gamma detector primarily sensitive to hydrogen and relatively insensitive to the effect of chlorine, as described above with particular regard to the apparatus shown in FIG. 1.

In order to insure that the hydrogen detector unit 33' is primarily responsive to the neutron-capture gamma rays due to hydrogen and not the natural gamma radiation or scattered gamma radiation from the neutron source, the discriminator associated therewith should advantageously be biased to exclude these undesirable lower energy gamma radiations. Preferably, the discriminator should be biased so that the measured radiation signal is indicative of gamma radiation having an electron energy of about 1.8 million electron volts and above as will be discussed later. This particular bias level, in combination with the 2" x 4" sodium iodide crystal and a cadmium layer for the neutron absorbing material which surrounds the luminophor 61 at a source-to-detector spacing of 16 inches operates to provide a very satisfactory logging signal which is primarily responsive to the hydrogen content of the formations, due to radiation resulting from irradiation of the formation by neutrons from the source. By thus biasing the detector to exclude lower energy gamma rays, most of the natural gamma radiation present in the formation and any gamma radiation scattered from the source is likely to be eliminated from the detected signal, since the natural and scattered gamma radiations are both of relatively low energy level.

The neutralization of the adverse effect of chlorine upon the neutron gamma ray well log described above is accomplished by subjecting the gamma ray detector to radiation which varies inversely with the effect upon the detector due to the presence of chlorine. By introducing a neutron-absorbing material such as cadmium which emits a plurality of neutron capture gamma radiations in the vicinity of the detector, thermal neutrons are absorbed in said material which result in the emission of gamma radiation which is detected by the gamma ray detector. Using a sodium iodide detector, the thickness of cadmium needs to be at least enough to absorb most of the thermal neutrons and the balance is achieved by adjusting the discriminator bias.

In the apparatus shown in FIG. 5, the above-mentioned two effects may be made equal and opposite either by adjusting the bias of the discriminator, by adjustment of the amount of the neutron absorbing material 66, or by a combination of the first two techniques. For example, the neutron absorbing material 66 may be a sheet of cadmium surrounding the crystal 61 at such a thickness, i.e. .025", that it essentially captures all of the thermal neutrons which diffuse to the layer of cadmium. The rise in the capture gamma component may be balanced against the thermal neutron component by a discriminator setting of approximately 1.8 mev. for a source-to-detector spacing of 16". The discriminator bias will be in the range from 1 to 2.5 mev. depending upon the detector-to-source spacing, the dimension of the crystal, the case thickness, the case material, the diameter of the bore hole and the salinity of the fluid.

At lower bias settings, there is more thermal neutron component than is necessary, and at higher bias settings there is less than is needed. Thus, in accordance with one aspect of the invention the bias may be set, for example, at 1.0 mev. and the thickness of cadmium adjusted so that the two effects cancel. In carrying out this aspect of the invention an additional neutron absorbing material, such as boron or lithium, should be placed between the crystal and the cadmium, and which is sufficiently thick to absorb the thermal neutrons transmitted through the cadmium. This is desirable since neither boron nor lithium emit neutron capture gamma rays above 1.0 mev. and the crystal would not become activated. This aspect may be carried out with the hydrogen detector of FIG. 5 by the addition of a layer of neutron capturing material, such as boron, between the neutron interaction material 66 and the luminophor 61.

In a preferred embodiment employing a neutron source comprising 200 mc. of Ra:Be, a sodium iodide crystal radiation detector of 4" length and 2" diameter biased at 1.8 mev., and having its near side spaced from the neutron source a distance of 16″, it has been found that with a logging instrument having a steel casing or housing having a thickness of 5/16″, a cadmium sleeve greater than 10 mils in thickness provides very satisfactory cancellation of the adverse effects of chlorine on the neutron-gamma ray log in formations having average ranges of porosity and salinity which are 10–30% porosity and salinities from zero to saturation.

In order to stabilize and protect the scintillation logging equipment against the effects of high bore hole temperatures and variations thereof, the luminophor 61 and photomultiplier tube 62, as well as the preamplifier 63, are all shown mounted within an insulated chamber 70 preferably in the form of a Dewar flask comprising an outer wall 71 separated from an inner wall 72 by an evacuated space 73. The insulating chamber 70 is provided with an appropriate removable insulating cover plug 74. Within the Dewar flask, advantageously affixed to the inside of the insulated cover plug 74, there is provided a coolant chamber 75 having thermally conductive walls as of thin aluminum and containing a quantity of ice 76. The coolant chamber 75 including the ice 76 affords means for maintaining the scintillation detection equipment in a stable, low temperature environment by virtue of the temperature stability afforded as the ice undergoes a change of state from the solid to the liquid phase during the logging operation. It is to be understood that other techniques for stabilizing the temperature of the instrument may be employed, for example, as shown and described in U.S. Letters Patent No. 2,824,233, granted February 18, 1958 to Gerhard Herzog.

The second or hydrogen plus chlorine detector 34′ is substantially like the first or hydrogen detector 33′ and similar elements bear corresponding reference numerals having a double primed designation. However, as in the case of the H+Cl detector unit 34 of FIG. 1, the H+Cl detector unit 34′ is not made insensitive to chlorine as in the case of the hydrogen detector 33′, instead, its sensitivity to chlorine is enhanced. In particular, the luminophor 61″ of the H+Cl detector unit 34′ differs from the luminophor 61 of the hydrogen detector unit 33′ in that it is not provided with a surrounding layer of cadmium. Also as in the case of the apparatus of FIG. 1, the H+Cl detector unit 34′ further differs from the hydrogen detector unit 33′ in that the portion of the logging instrument housing in the vicinity of the luminophor 61″ is surrounded with a layer 80 of material having a relatively high thermal neutron capture cross-section and which is further characterized in that it has relatively insignificant high energy gamma ray emission characteristics in response to the capture of a thermal neutron. Advantageously, this material comprises boron or a boron compound in admixture with a suitable binder.

In order to enhance the sensitivity of the H+Cl detector unit 34′ to chlorine, the discriminator circuitry associated therewith should be biased to eliminate gamma rays of 2.2 million electron volts which are characteristic of the capture of thermal neutrons by hydrogen. This may be accomplished by establishing the bias of the discriminator at about 3 million electron volts in order that the detected gamma rays will significantly indicate the higher energy gamma rays caused by the presence of chlorine in the formation irradiated by neutrons from the source 31.

The third or scattered gamma ray detector unit 36′ comprises a gamma radiation sensitive scintillation detector 60‴ generally like that employed as the neutron-gamma ray detectors and corresponding elements of the scattered gamma ray detector unit 36′ bear the same reference numerals as those of the neutron-gamma ray detectors but with a triple prime designation. As in the case of the corresponding apparatus of FIG. 1, the scattered gamma ray detector unit 36′ differs from the neutron-gamma ray H detector unit 33′ by the omission of the neutron interaction material such as cadmium and differs from the neutron-gamma ray H+Cl unit 34′ by the omission of the layer of material such as boron around the outlet of the instrument housing. Moreover, the scattered gamma ray detector is not biased like the neutron-gamma detectors. In particular, the scattered gamma ray detector is adapted and arranged to be sensitive primarily to scattered gamma rays resulting from the gamma ray source. Provided the source is of sufficient strength, the intensity of the scattered gamma radiation will override any natural gamma radiation present in the bore hole to assure an adequate signal-to-noise ratio. However, it is possible to utilize a pulse-height analyzer for selective amplitude measurement of the detected gamma radiation to emphasize the scattered gamma radiation, as compared with any natural gamma radiation which may be present. When utilizing a gamma ray source of the order of 200 milligrams of radium it has been found that the natural background radiation may be adequately overcome. In such case the detected scattered gamma rays have an average energy of .2–.3 mev. The energy level of the natural gamma radiation may extend up to 2.62 mev.

In a preferred embodiment a scattered gamma ray source comprising 200 milligrams of radium has been employed with a scattered gamma ray detector unit 36′ comprising a sodium iodide luminophor crystal 61‴ one and one-half (1½) inches in length and two (2) inches in diameter having its near side spaced from the gamma ray source a distance of 12 inches.

Referring now to FIG. 7 there is shown in schematic form a diagram of a suitable electrical system for transmitting signals from the logging instrument, represented by the dashed box A, in the bore hole 10 to the surface equipment, represented by the dashed box B. This system involves the use of a separate or individual insulated conductor in a multi-conductor cable for each signal channel. The conductive sheath of the multi-conductor cable is employed as the common ground return circuit for all channels.

In FIG. 7, the gamma-gamma density detector unit 100, the neutron-gamma H detector unit 101 and the neutron-gamma H+Cl detector unit 102 are all illustrated in block form and it is understood that they represent the corresponding detector units illustrated in FIGS. 1 or 5. The circuitry comprising each of the three signal transmission channels is substantially identical. The gamma-gamma channel includes a pulse type detector unit 100, which may be of the geiger or scintillation type including an amplitude discriminator if desired, having its output coupled across a grid resistance 103 to common ground and through a current limiting resistance 104 to the control grid 105 of an electron discharge device 106 which is connected in circuit as an amplifying device for enhancing the signal applied thereto from the detector unit 100. The amplifying circuit includes a cathode resistance 107 and a parallel cathode by-pass capacitor 108 coupled from the cathode 109 to common ground. The output of the amplifying device 106, derived from the anode 110, is coupled through the primary winding 111 of a transformer 112 to a source of B+ operating potential. The secondary winding 113 of the transformer 112 is connected in series with one of the conductors 114 of the multi-conductor cable 115 for transmission to the surface of the earth over the conductor 114 and the cable sheath 116 which serves as common ground. At the surface of the earth the conductor 114 for the gamma-gamma channel is coupled to a gamma-gamma rate meter 117 whose output is, in turn, coupled to a gamma-gamma recorder 118. It is to be understood that the rate meter 117 may include an amplifier, a pulse-height equalization network and integrating network as may be required for providing an accurate indication of the rate-of-occurrence of the signals transmitted to the surface of the earth. The recorder 118 is also supplied with a signal from the logging instrument depth measuring device, represented diagrammatically as wheel 119, as by means of a conductor 120 in order to provide for correlation of a recorded radiation signal with the position of the logging instrument in the bore hole.

Electric power of appropriate voltage and current, as is well known in the art, may be supplied as alternating current transmitted from the surface over the gamma-gamma conductor 114 and sheath 116 and coupled to the power supply apparatus (not shown).

The circuit for the neutron-gamma H and H+Cl channels is similar to that of the gamma-gamma channel and corresponding elements are identified with the same reference numerals as those of the gamma-gamma channel, but with a prime designation for the elements of the H channel and a double prime designation for the H+Cl channel.

Referring now to FIG. 8 there is shown in schematic form a preferred circuit system for transmitting the respective signals from the detectors in the logging instrument to the surface equipment by means of a single conductor cable including a common ground return sheath.

In the system illustrated in FIG. 8 the neutron-gamma ray hydrogen or H detector unit 101 is similar to the corresponding detector unit 101 illustrated in FIG. 7 and comprises a pulse-type detector having its output coupled across a grid resistance 203′ to common ground and is coupled through a current limiting resistance 204′ to the control grid 205′ of an electron discharge device 206′ connected in circuit as an amplifying device for enhancing the signal applied thereto from the detector. The amplifier circuit includes a cathode resistance 207′ and cathode by-pass resistance 208′ coupled in parallel from the cathode 209′ of the device 206′ to ground. The output of the amplifying device is derived from its anode 210′ and coupled to one end of a first primary winding 211a of a transformer 212 so that the output of the neutron-gamma ray hydrogen detector 101 and amplifier will be applied thereto with a given polarity and amplitude. The other end of the first primary winding 211a is coupled to a source of B+ operating potential for the amplifying device. It is understood that the other side of the B+ source (not shown) is connected to common ground to complete the usual circuit paths. The secondary winding 213 of the transformer 212 is connected in series with the single insulated conductor 230 of the single conductor cable 231, which also includes another conductive ground sheath 232.

The neutron-gamma ray H+Cl detector 102 is likewise similar to the corresponding detector illustrated in FIG. 7 and includes a pulse-type detector having its output coupled across a grid resistance 203″ to common ground and through a current limiting resistance 204″ to the control grid 205″ of another amplifying device 206″ for enhancing the signal applied thereto from the H+Cl detector. The amplifying device 206″ includes anode 210″ and cathode 209″ electrodes. The cathode 209″ is coupled to ground through cathode resistance 207″ and associated cathode by-pass capacitor 208″. The output of the other amplifying device 206″ is coupled from the anode 210″ through a dropping resistance 240 to the first winding 211a of the transformer 212. The dropping resistance 240, which may be made adjustable if desired, is selected in value so that the amplitude of the H+Cl signal pulse appearing at the first winding 211a of the transformer 212 will be of substantially lower amplitude than the output pulses of the hydrogen detector which are applied to the same end of the same winding 211a. From the above it is seen that the output pulses of both the H and H+Cl detectors are applied to the same winding 211a in the same polarity, but are of significantly different amplitude.

The gamma-gamma radiation detector 100 of the apparatus shown in FIG. 8 is also similar to the corresponding portion of the apparatus of FIG. 7 and in particular comprises a pulse-type detector having its output coupled across a grid resistance 203 to common ground and also through a current limiting resistance 204 to the control grid 205 of an electron discharge device 206 having an anode and a cathode and being connected in circuit as an amplifier for enhancing the signal applied thereto from the detector. The amplifier includes a cathode resistance 207 and associated by-pass condenser 208. The output of the gamma-gamma channel amplifier is applied to second primary coil 211b of the transformer 210. Similar to the H and H+Cl detector amplifiers, the B+ operating potential is supplied to the gamma-gamma amplifier device through the second primary coil 211b. The second primary coil 211b of the transformer 212 is arranged in polar opposed relationship with respect to the first primary winding 211a so that the gamma-gamma pulses will appear in the secondary 213 of the transformer 212 in opposite polarity to the H and H+Cl pulses applied by means of the first coil 211a. The polarity and amplitude relationships of the respective signal pulses are illustrated diagrammatically in the drawing.

The downhole instrument circuitry also includes operating power equipment (not shown) such as a power transformer and appropriate rectifying apparatus as is well known in the art for providing the required D.C. operating potentials for operating the detectors and associated circuitry including the amplifiers. Inasmuch as such equipment is well known in the art it is not illustrated in detail. It is noted that the lower end of the secondary winding of the transformer 212 is connected to common ground through an appropriate capacitor 251 for bypassing the detector output signals past the power supply.

The surface equipment of the apparatus shown in FIG. 8 is enclosed within the dashed box 255. The H and H+Cl pulses are transmitted to the surface as positive-going pulses of respectively different amplitudes and the gamma-gamma pulses are transmitted as negative-going pulses. The positive-going pulses are separated from the negative-going pulses by means of a first signal separator 260 having one output path for positive-going pulses and another output path for negative-going pulses. The separated positive pulses are coupled through circuitry identified as No. 1 rate meter 261 which is appropriately arranged to transmit to the neutron-gamma ray hydrogen recorder 218′ a signal proportional only to the occurrence of the higher amplitude neutron-gamma ray hydrogen pulses. The No. 1 rate meter circuitry 261 is is schematically illustrated in greater detail in FIG. 8a wherein it is shown as comprising an amplifier 262 having its output coupled to a multi-vibrator 263 having first and second output paths. The first output path is coupled to an integrator 264 which, in turn, has its output coupled to a D.C. amplifier 265. The output of the D.C. amplifier 265 is coupled to recorder 218′. As indicated above, the No. 1 rate meter 261 is operated in such manner, as by appropriate amplitude biasing, to transmit only the upper portion of the hydrogen pulses, above the tops of the H+Cl pulses, to the integrator 264 so that its output applied to the recorder 218′ will be proportional to the rate of occurrence of only the higher amplitude pulses.

As will be seen by referring to FIG. 8 or FIG. 8a, the No. 1 rate meter 261 also provides a second output path to the channel for the H+Cl pulses. This is provided so that the higher amplitude pulses representative of the hydrogen signal can be coupled to the H+Cl channel for selectively cancelling corresponding pulses from the H+Cl channel leaving only the lower amplitude H+Cl pulses to provide the desired signal. In particular, the positive-going output of the signal separator 260 including both high amplitude H pulses and lower amplitude H+Cl pulses is applied to a noise discriminator 266 which, in turn, is coupled to an anti-coincidence circuit 267. Both the higher and lower energy positive-going pulses are applied to the anti-coincidence circuit. However, as mentioned above, the output of the No. 1 rate meter 261 representative of only the higher amplitude pulses is also coupled to the anti-coincidence circuit 267. By this means the positive-going higher amplitude pulses occurring in coincidence may be cancelled out of the signal appearing at the output of the anti-coincidence circuit 267 so that the No. 2 rate meter 268 coupled thereto receives only the lower amplitude positive-going pulses representative of the H+Cl signal. It is understood that the No. 2 rate meter 268 includes appropriate pulse-shaping and integrating means so that its output provides a signal proportional to the rate of occurrence of the lower energy positive-going H+Cl pulses. The output of the No. 2 rate meter is applied to an appropriate display device shown as the H+Cl recorder 218''.

The negative-going gamma-gamma output of the signal separator 260 is coupled to a pick off circuit 270 for the negative pulses, which has its output coupled to a No. 3 rate meter 271 which is suited to provide the required pulse-shaping and integrating functions so that an output proportional to the rate of occurrence of the negative-going gamma-gamma pulses may be coupled therefrom to a display device shown as a gamma-gamma recorder 218.

A suitable source of alternating current power, shown diagrammatically as a generator 275, is coupled to the negative pulse pick off circuit for transmission over the cable 231 to the logging instrument. It is understood that the A.C. current power may conveniently be 60 cycle line current delivered to the single conductor cable system for transmission to the logging instrument for powering the instrumentation in the bore hole. The A.C. line current may be maintained separate from the signal information by appropriate filtering in a manner well known in the art.

For purposes of correlating the detected radiation signals with the position of the logging instrument in the bore hole, there is shown diagrammatically a depth measuring device 219 in contact with the cable 231 at the surface of the earth. The output of the depth measuring device is shown coupled over a suitable path 220 to each of the three recording devices, 218, 218', 218'', so that a record of the position of the logging instrument may be recorded simultaneously with the detected radiation signals.

Although three separate recording devices are illustrated in the drawing it is to be understood that a single, multi-channel recorder may be employed and, in fact, is a preferred manner of carrying out the invention so that three radiation signals may be recorded in correlation with the depth measurement as separate tracks on the same record.

It is noted that the logging systems disclosed herein may include either scintillation-type detectors or gaseous discharge-type detectors such as the high efficiency multiple plate geiger counters mentioned herein above. Preferably, however, the high efficiency geiger-type counters should be employed for the gamma-gamma radiation portion of the system, even in the case where scintillation-type detectors may be employed as the other detectors, namely for the H and H+Cl detectors. For correlation purposes it is preferred that all three detectors be of the same type, namely of the high efficiency geiger type.

It will be appreciated that the logging instrument herein described, capable of conducting the neutron-gamma hydrogen log, neutron-gamma hydrogen+chlorine log and gamma-gamma ray density log, is particularly advantageous for correlation purposes especially when equipped with a decentralizing means such as the illustrated bow spring device inasmuch as this assures that all three logs track along the same side of the bore hole throughout the entire well log. This feature is especially important where, as in the present case, quantitative evaluations are to be made based upon correlated logging signals.

In accordance with a further feature of the present invention it is contemplated that the gamma-gamma density measuring portion of the logging instrument may be employed to carry out a caliper log of the bore hole. Such a caliper log may be employed for deriving a correction factor for accounting for variations in bore hole size on the other two logs, namely the two neutron-gamma ray logs. This aspect of the invention may advantageously be carried out by utilizing a logging instrument such as that herein specifically disclosed, as for example, that of FIGS. 1 or 5, and which is preferably modified as shown in FIG. 9 by having the gamma-gamma ray portion of the logging instrument reversed 180° about the longitudinal axis of the instrument so that the gamma-gamma portion of the logging instrument as shown in the upper end of the instrument faces the open portion of the bore hole, rather than facing the adjacent formation toward which the instrument is decentralized as in the case of a gamma-gamma density log. The elements of the instrument shown in FIG. 9 are identified with the same reference numerals as the corresponding elements of FIG. 1, except for the gamma-gamma caliper element, which, due to their reversed position, have an "a" designation along with the same reference numeral as the corresponding element of FIG. 1. In accordance with this modified aspect of the instrumentation herein disclosed it will be appreciated that the shielding will then be positioned along the side of the instrument which is urged against the adjacent formation so that radiation scattering from the source to detector by the adjacent earth formation will be minimized whereas the collimated opening of the source will be directed toward the distant formation away from which the instrument is maintained by the bow spring. Thus, the scattered gamma radiation will be influenced by the quantity of well fluid which will vary with the size of the bore hole. The earth formation being at a greater distance from the exposed sides of the gamma radiation source and detector in this instance will have a lesser influence on the scattered gamma ray signal than in the case where the scattered gamma radiation is directed toward the adjacent formation and shielded from the well fluid and the distant formation.

It will be appreciated that the aspect of the invention involving a gamma-gamma caliper measurement may also be carried out as an additional gamma-gamma portion of a logging instrument such as those shown in FIGS. 1 and 5. FIG. 10 illustrates this aspect of the invention. In this instance the formation logging instrumentation is substantially the same as that shown in FIG. 1 and corresponding elements of FIGS. 1 and 10 have the same reference numerals, including both scattered neutron-gamma ray and scattered gamma ray equipment all directed toward the adjacent earth formation. The additional scattered gamma ray caliper unit corresponds to the caliper unit of FIG. 9 and bears the same reference numeral. This unit is directed away from the adjacent earth formation for making a bore hole caliper measurement as described above. Although the additional scattered gamma caliper log may conveniently be positioned at the top of the instrument with an additional gamma radiation source adjacent the gamma source used for the density measurement and the caliper gamma radiation detector at the upper end of the instrument in accordance with a perferred aspect of the invention as shown in FIG. 10 it is contemplated that the same gamma radiation source may be used for the gamma radiation density and the caliper logs by the addition of another collimating opening 38b in the gamma radiation source shield 37b for directing gamma radiation toward the well fluid and distant formation in an arc generally opposite the collimated opening 38 used for the formation density log. In this case the additional gamma detector should be located above the source with the electrons between source and caliper detector. A gamma radiation shield should be positioned between the gamma radiation source and caliper detector to block the direct passage of gamma radiation and the side of the caliper detector adjacent the formation should be shielded from gamma radiation scattered by the adjacent formation.

In the case of apparatus as shown in FIG. 10, it will be appreciated that additional instrument circuitry and an additional surface channel is to be provided for the additional caliper measurement. In the case of the single conductor cable transmission system this feature may advantageously be carried out by transmitting the caliper information to the surface as an additional negative-going pulse of lower amplitude than the negative-going gamma-gamma density pulse. This may be accomplished by use of an additional channel having a dropping resistance for the additional gamma-gamma caliper channel. This pulse may be separated at the surface through the use of an anti-coincidence arrangement in a manner similar to that employed for separating the two positive-going pulses from one another.

It will be appreciated that in the case of the multi-conductor cable circuitry it is only necessary to add an associated circuitry for the gamma-gamma caliper channel. It is also contemplated within the scope of the present invention that the combination oil-water-gas logging apparatus and techniques herein disclosed may be carried out utilizing a neutron-neutron log, especially a neutron-thermal neutron log for developing the hydrogen+chlorine signal which is to be correlated or combined with the neutron-gamma ray log which is rendered insensitive to chlorine.

It will be appreciated that the gamma ray portion of the apparatus illustrated in FIG. 10, including the gamma ray apparatus for conducting a log of earth formations in combination with the gamma ray logging apparatus for conducting a caliper log of the bore hole, may be employed to carry out gamma ray logging operations independently of the neutron well logging apparatus included in the lower portion of the instrument.

Whether the gamma ray apparatus shown in FIG. 10 is employed with or without the neutron logging apparatus, it is nevertheless contemplated that a gamma ray density log of earth formations may be conducted with the formation logging gamma ray equipment and that the simultaneously run caliper log may be employed to provide information for correcting the influence of variations in bore hole size upon the gamma ray density log. Conversely, the gamma ray formation logging information obtained by the formation logging equipment may be employed to provide a correction factor for correcting the gamma ray caliper log for the influence of variations in formation density on the caliper log.

It is noted that the gamma radiation shielding equipment of the gamma-gamma formation logging portion of the instrument illustrated in FIG. 10 provides means for directing gamma radiation along the formation being logged through the collimating opening in a direction generally toward the adjacent earth formation in a relatively confined or focused beam. The shield is designed to prevent the passage of gamma radiation from the source in directions generally upwardly as shown in FIG. 10 along the face of the formation being logged.

Similarly, the shield for the gamma radiation source is designed to direct the caliper gamma radiation beam in a relatively narrow focused beam generally into the open bore hole on the side of the instrument remote from the adjacent formation being logged. The collimating aperture on the caliper side of the instrument is designed to direct the gamma rays in a beam generally toward the open bore hole and upwardly toward the caliper detector and is designed to prevent the passage of gamma rays generally downwardly through the open bore hole toward the formation logging apparatus.

Referring now to FIG. 11 there is shown a diagrammatic illustration of a bore hole including a logging instrument 17 constructed in accordance with features of the present invention and having plotted alongside the bore hole an idealized version of a typical logging record showing the H or hydrogen trace, the H+Cl or hydrogen plus chlorine trace and the gamma-gamma density trace in inverted relationship. The logging instrument 17 corresponds to that of FIG. 10. The surface equipment is identical with that of FIG. 8 with the addition of another negative-going channel for the caliper log, as described above with respect to the apparatus of FIG. 10.

In FIG. 10 the H trace indicates radiation intensity detected by the hydrogen detector, increasing to the right as seen in the record, and being representative of the hydrogen content of the formation. The H+Cl trace shows the intensity of the radiation indicative of hydrogen-plus-chlorine, also increasing to the right as seen in the record. Regions of corresponding deviations of the two traces indicate the presence of oil or fresh water. Regions where the H+Cl signal exceeds the H signal indicates the presence of salt water. Both the H and H+Cl traces provide a quantitative indication as well as a qualitative indication.

In order to determine more accurately whether or not regions of high hydrogen concentration contain oil or gas, reference is had to the corresponding portions of the gamma-gamma density trace in correlation with the H trace. The density trace is shown with the direction of increasing radiation increasing to the left, i.e. inverted relative to the other logs. Regions of relatively high density in combination with relatively high hydrogen content and low chlorine content indicate the presence of oil. In regions where the density log indicates relatively low density and where the H and H+Cl logs indicate relatively high hydrogen content and low chlorine content, the presence of hydrocarbon gas is indicated.

For correlation purposes, useful in analyzing the other logging information, the caliper log is indicated as trace C plotted parallel to the other logging traces.

It is to be understood that although the various logging records may be recorded as individual traces it is contemplated that the H and H+Cl signals may be recorded together as a signal showing only hydrogen content together with a second correlated signal showing the ratio or difference between the H and H+Cl signals. The H signal may also be plotted versus the H+Cl signal, in which case a straight line indication is given for oil or fresh water and deviations therefrom indicate the chlorine content.

It will be appreciated by those skilled in the art that the herein disclosed apparatus involving the use of a common hydrogen-sensitive detector which is rendered insensitive to the influence of chlorine for both the oil-water logging and gas-liquid logging operations is particularly advantageous inasmuch as a common hydrogen detector facilitates quantitative evaluation of the logging information in arriving at the oil-water-gas content of the formations logged.

Obviously many modifications and variations of the invention, as hereinbefore set forth, may be made without departing from the spirit and scope thereof, and therefore only such limitations should be imposed as are indicated in the appended claims.

I claim:

1. Apparatus for conducting a radioactivity well log comprising an instrument housing adapted to be passed through a bore hole traversing a plurality of earth formations, said housing containing a source of fast neutrons, a first detecting unit quantitatively sensitive to gama radiation returning to the bore hole as a result of irradiation of the formation by neutrons from the neutron source and which is adapted and arranged to provide an output signal primarily indicative of the presence of hydrogen in said formation and substantially insensitive to the presence of chlorine, said first detecting unit comprising a gamma radiation detector and a predetermined quantity of neutron absorbing material positioned in the vicinity of said detector and characterized by the emission of radiation to which the detector is sensitive, said detector being substantially unshielded with respect to said radiation emitted from said neutron absorbing material such that said detector is exposed to at least a major portion of said radiation emitted from said neutron absorbing material and traveling toward said detector, whereby said detector is rendered sensitive to both neutron-gamma radiation and thermal neutron radiation in the bore hole resulting from said irradiation of the formation by neutrons, a second radiation detecting unit positioned within said housing and being adapted to provide a quantitative signal of the gamma radiation returning to the bore hole as a result of irradiation by neutrons from the neutron source and which gamma rays are indicative of both the hydrogen and chlorine contents of the formations, a source of gamma radiation positioned at a location in said housing remote from said first and second detector units whereby said first and second detector units are beyond substantial influence of said gamma ray source, a third radiation detecting unit positioned within said housing in the vicinity of said gamma ray source for detecting gamma radiation scattered thereto as the result of irradiation by said gamma radiation source, means for continuously urging one side of said instrument against the side of the bore hole as the instrument is passed therethrough, and means for providing a signal display quantitatively indicating the intensity of the radiation detected by said three detecting units in correlation with the position in the bore hole where said radiation is detected.

2. Apparatus for conducting a radioactivity well log comprising an instrument housing adapted to be passed through a bore hole traversing a plurality of earth formations, said housing containing a source of fast neutrons, a first detecting unit quantitatively sensitive to gamma radiation returning to the bore hole as a result of irradiation of the formation by neutrons from the neutron source and which is adapted and arranged to provide an output signal primarily indicative of the presence of hydrogen in said formation and substantially insensitive to the presence of chlorine, said first detecting unit comprising a gamma radiation detector and a predetermined quantity of neutron absorbing material positioned in the vicinity of said detector and characterized by the emision of radiation to which the detector is sensitive, said detector being substantially unshielded with respect to said radiation emitted from said neutron absorbing material such that said detector is exposed to at least a major portion of said radiation emitted from said neutron absorbing material and traveling toward said detector, whereby said detector is rendered sensitive to both neutron-gamma radiation and thermal neutron radiation in the bore hole resulting from said irradiation of the formation by neutrons, a second radiation detecting unit positioned within said housing and being adapted to provide a quantitative signal of the gamma radiation returning to the bore hole as a result of irradiation by neutrons from the neutron source and which gamma rays are indicative of both the hydrogen and chlorine contents of the formations, a source of gamma radiation positioned at a location in said housing remote from said first and second detector units whereby said first and second detector units are beyond substantial influence of said gamma ray source, a third radiation detecting unit positioned within said housing in the vicinity of said gamma ray source for detecting gamma radiation scattered from adjacent earth formations as the result of irradiation by said gamma radiation source, gamma source shielding means including a collimated opening for directing gamma radiation from said gamma source primarily toward the earth formations on one side of said instrument while minimizing the emission of gamma radiation in other directions from said gamma source, means for shielding said third detection unit from stray gamma radiation in the bore hole on the side of said instrument opposite said one side, means for continuously urging said one side of said instrument against the side of the bore hole as the instrument is passed therethrough, and means for providing a signal display quantitatively indicating the intensity of the radiation detected by said three detecting units in correlation with the position in the bore hole wherein said radiation is detected.

3. Apparatus for conducting a radioactivity well log comprising an instrument housing adapted to be passed through a bore hole traversing a plurality of earth formations, said housing containing a source of fast neutrons, a first detecting unit quantitatively sensitive to gamma radiation returning to the bore hole as a result of irradiation of the formation by neutrons from the neutron source and which is adapted and arranged to provide an output signal primarily indicative of the presence of hydrogen in said formation and substantially insensitive to the presence of chlorine, said first detecting unit comprising a gamma radiation detector and a predetermined quantity of neutron absorbing material positioned in the vicinity of said detector and characterized by the emission or radiation to which the detector is sensitive, said detector beng substantially unshielded with respect to said radiation emitted from said neutron absorbing material such that said detector is exposed to at least a major portion of said radiation emitted from said neutron absorbing material and traveling toward said detector, whereby said detector is rendered sensitive to both neutron-gamma radiation and thermal neutron radiation in the bore hole resulting from said irradiation of the formation by neutrons, a second radiation detecting unit positioned within said housing and being adapted to provide a quantitative signal of the gamma radiation returning to the bore hole as a result of irradiation by neutrons from the neutron source and which gamma rays are indicative of both the hydrogen and chlorine contents of the formations, a source of gamma radiation positioned at a location in said housing remote from said first and second detector units whereby said first and second detector units are beyond substantial influence of said gamma ray source, a third radiation detecting unit positioned within said housing in the vicinity of said gamma ray source for detecting gamma radiation scattered in the bore hole as the result of irradiation by said gamma radiation source, gamma source shielding means including a collimated opening for directing gamma radiation from said gamma source primarily away from the earth formations on one side of said instrument and through the material of the bore hole in order to minimize the influence of the material of the adjacent earth formations, means for shielding said third detector unit from stray gamma radiation in the bore hole on said one side of said instrument, means for continuously urging said one side of said instrument against a side of the bore as the instrument is passed therethrough, and means for providing a signal display quantitatively indicating the intensity of the radiation detected by said three detecting units in correlation with the position in the bore hole where said radiation is detected.

4. Apparatus for conducting a radioactivity well log comprising a generally elongated instrument housing adapted to be passed through a bore hole traversing a plurality of earth formations, said housing containing a source of fast neutrons, a first detecting unit quantitatively sensitive to gamma radiation returning to the bore hole as a result of irradiation of the formation by neutrons from the neutron source and which is adapted and arranged to provide an output signal primarily indicative of the presence of hydrogen in said formation and substantially insensitive to the presence of chlorine, a second radiation detecting unit positioned within said housing and being adapted to provide a quantitative signal of the gamma radiation returning to the bore hole as a result of irradiations by neutrons from the neutron source and which gamma radiation is indicative of both the hydrogen and chlorine contents of the formations, a source of gamma radiation positioned at a location in said housing spaced remotely along the elongated axis of said housing from said first and second detector units whereby said first and second detectors are beyond substantial influence of said gamma ray source, a third radiation detecting unit positioned within said housing in the vicinity of said gamma ray source for detecting gamma radiation scattered from adjacent earth formations as the result of irradiation by said gamma radiation source, a fourth radiation detecting unit positioned within said housing in the vicinity of said gamma radiation source for detecting gamma radiation scattered in the bore hole as the result of irradiation by said gamma radiation source, gamma source shielding means for minimizing the passage of direct and scattered stray gamma radiation from said gamma source to said detecting units and including a first collimating opening for directing gamma radiation toward the earth formation along one side of said instrument and a second collimating opening for directing gamma radiation toward the bore hole opposite said one side of said instrument, means for continuously urging said one side of said instrument against the side of the bore hole as the instrument is passed therethrough, and means for providing a signal display quantitatively indicating the intensity of the radiation detected by said four detecting units in correlation with the position in the bore hole where said radiation is detected.

5. Apparatus as defined in claim 4 wherein the first and second detecting units responsive to the radiation due to irradiation of the formation by the neutron source are positioned on opposite sides of said neutron source along the elongated axis of said instrument housing, and wherein said third and fourth radiation detecting units responsive to the gamma radiation scattered from said gamma ray source are positioned on opposite sides of the gamma ray source along the elongated axis of the housing.

6. Apparatus for conducting a radioactivity well log comprising a generally elongated instrument housing adapted to be passed through a bore hole traversing a plurality of earth formations, said housing containing a source of gamma radiation positioned in said housing, a first radiation detecting unit positioned within said housing in the vicinity of said gamma ray source for logging said formations by detecting gamma radiation scattered from adjacent earth formations as the result of irradiations by said gamma radiation source, a second radiation detecting unit positioned within said housing in the vicinity of said gamma radiation source for calipering said bore hole by detecting gamma radiation scattered in the bore hole as the result of irradiation by said gamma radiation source, gamma source shielding means for minimizing the passage of direct and scattered stray gamma radiation from said gamma source to said detecting units and including a first collimating opening for directing gamma radiation toward the earth formation along one side of said instrument and a second collimating opening for directing gamma radiation toward the bore hole opposite said one side of said instrument, means for continuously urging said one side of said instrument against the side of the bore hole as the instrument is passed therethrough, and means for providing a signal display quantitatively indicating the intensity of the radiation detected by said detecting units in correlation with the position in the bore hole where said radiation is detected.

7. Apparatus as defined in claim 6 wherein said first and second gamma radiation detecting units are positioned on opposite sides of the gamma ray source along the elongated axis of the housing.

8. Apparatus for conducting a radioactivity well log comprising an instrument housing adapted to be passed through a bore hole traversing a plurality of earth formations, said housing containing a source of fast neutrons, a first detecting unit quantitatively sensitive to gamma radiation returning to the bore hole as a result of irradiation of the formation by neutrons from the neutron source and which is adapted and arranged to provide an output signal primarily indicative of the presence of hydrogen in said formation and substantially insensitive to the presence of chlorine, a second radiation detecting unit positioned within said housing and being adapted to provide a quantitative signal of the gamma radiation returning to the bore hole as a result of irradiation by neutrons from the neutron source and which gamma rays are indicative of both the hydrogen and chlorine contents of the formation, a source of gamma radiation positioned at a location in said housing remote from said first and second detector units whereby said first and second detector units are beyond substantial influence of said gamma ray source, a third radiation detecting unit positioned within said housing in the vicinity of said gamma ray source for detecting gamma radiation scattered thereto as the result of irradiation by said gamma radiation source, means for continuously urging one side of said instrument against the side of the bore hole as the instrument is passed therethrough, a single conductor cable transmission system including a single insulated conductor and a common ground path for simultaneously transmitting the outputs of said three detector units from the logging instrument to surface equipment, said signal transmission system including means for transmitting a first one of said signals over said conductor as pulses of a first polarity having a predetermined amplitude, means for transmitting a second one of said signals over said conductor as pulses of said first polarity and a significantly different amplitude than said first signal pulses and means for transmitting the third signal over said conductor as pulses of opposite polarity to said first and second signals, polarity separating means coupled to said conductor at the surface for separating said pulses according to polarity, amplitude separating means coupled to said polarity separating means for separating said polarity separated pulses according to amplitude, said amplitude separating means including an anti-coincidence circuit comprising first and second input means and characterized in that pulses coincidentally applied to said first and second input means are cancelled from the output signal thereof, means for selectively translating only pulses of a given polarity corresponding to said first signal having at least a predetermined upper amplitude level, and means for applying pulses of a given polarity corresponding to said first and second signals having amplitudes both above and below said predetermined level to one of the input means of said coincident circuit, means including said translating means for applying only pulses corresponding to said first signal of at least said predetermined upper amplitude level to the other of said anti-coincident circuit inputs whereby the output of said anti-coincident circuit includes only pulses corresponding to said second signal below said predetermined upper level to the exclusion of coincidentally occurring pulses above said predetermined level, and means for providing a signal display quantitatively indicating the respective rates of occurrence of said polarity and amplitude separated pulses corresponding to said first, second, and third signals proportionally related to the intensity of the radiation detected by each of said three detecting units in correlation with the position in the bore hole where said radiation is detected.

9. Apparatus for conducting a well logging operation comprising an instrument housing adapted to be passed through a bore hole traversing a plurality of earth formations, said housing including means for developing at least three signals indicative of a value measured in the bore hole, a signal transmission system including a single insulated conductor and a common ground path for simultaneously transmitting said three signals from the logging instrument to surface equipment, said signal transmission system including means for transmitting a first one of said signals over said conductor as pulses of a first polarity having a predetermined amplitude, means for transmitting a second one of said signals over said conductor as pulses of said first polarity and a significantly different amplitude than said first signal pulses, means for transmitting the third signal over said conductor as pulses of opposite polarity to said first and second signals, polarity separating means coupled to said conductor at the surface for separating said pulses according to polarity amplitude separating means coupled to said polarity separating means for separating said polarity separated pulses according to amplitude, said amplitude separating means including an anti-coincidence circuit comprising first and second input means and characterized in that pulses coincidentally applied to said first and second input means are cancelled from the output signal thereof, means for selectively translating only pulses of a given polarity corresponding to said first signal having at least a predetermined upper amplitude level, and means for applying pulses of a given polarity corresponding to said first and second signals having amplitudes both above and below said predetermined level to one of the input means of said coincident circuit, means including said translating means for applying only pulses corresponding to said first signal of at least said predetermined upper amplitude level to the other of said anti-coincident circuit inputs whereby the output of said anti-coincident circuit includes only pulses corresponding to said second signal below said predetermined upper level to the exclusion of coincidentally occurring pulses above said predetermined level, and means for providing a signal display proportional to the respective rates of occurrence of said polarity and amplitude separated pulses corresponding to said first, second, and third signals in correlation with the position in the bore hole where said signals are derived.

10. Apparatus for conducting a well logging operation comprising an instrument housing adapted to be passed through a bore hole traversing a plurality of earth formations, said housing including means for developing at least four signals indicative of a value measured in the bore hole, a single conductor cable transmission system including a single insulated conductor and a common ground path for simultaneously transmitting said four signals from the logging instrument to surface equipment, said signal transmission system including means for transmitting a first one of said signals over said conductor as pulses of a first polarity having a predetermined amplitude, means for transmitting a second one of said signals over said conductor as pulses of said first polarity and a significantly different amplitude than said first signal pulses, means for transmitting a third one of said signals as pulses of given amplitude and opposite polarity to said first and second signals, means for transmitting the fourth one of said signals over said conductor as pulses of said opposite polarity and a significantly different amplitude than said given amplitude, means coupled to said conductor at the surface for separating said pulses according to polarity and having a first output path for pulses of one polarity and a second output path for pulses of the opposite polarity, first and second amplitude separating means respectively coupled to said first and second output paths for separating said polarity separated pulses according to amplitude, said amplitude separating means including an anti-coincidence circuit comprising first and second input means and characterized in that pulses coincidentally applied to said first and second input means are cancelled from the output signal thereof, means for selectively translating only pulses of a given polarity having at least a predetermined upper amplitude level, and means for applying pulses of a given polarity having amplitudes both above and below said predetermined level to one of the input means of said coincident circuit, means including said translating means for applying only pulses of at least said predetermined upper amplitude level to the other of said anti-coincident circuit inputs whereby the output of said anti-coincident circuit includes only pulses below said predetermined upper level to the exclusion of coincidentally occurring pulses above said predetermined level, and means coupled to said amplitude separating means for providing a signal display proportional to the respective rates of occurrence of said polarity and amplitude separated pulses corresponding to said first, second, third and fourth signals in correlation with the position in the bore hole where said signals are derived.

11. The method of radioactivity well logging of earth formations traversed by a bore hole for determining the presence of oil, water, or gas therein which comprises passing a source of neutrons through the bore hole to irradiate the formations along the bore hole, selectively detecting radiation resulting from said neutron irradiation which is primarily indicative of both chlorine and hydrogen and recording a first signal proportional to the intensity thereof, selectively detecting radiation comprising the combination of a neutron-gamma component and a thermal neutron component occurring in the bore hole as the result of said neutron irradiation whereby the combination of said two radiation components is primarily indicative of hydrogen to the substantial exclusion of chlorine and recording a second signal proportional to the intensity thereof, said first and second signals being recorded in correlation with the position of the detected radiation in the bore hole in such manner that differences between the two signals provide a quantitative measure of the chlorine content of the formation and corresponding variations in the two signals provide a quantitative indication of the hydrogen content of the formations, passing a gamma ray source through the bore hole to irradiate said formations therewith, detecting in the bore hole radiations scattered by the irradiated formations as a measure of the density of said formations, and recording a signal proportional to the intensity of said scatterd gamma radiation in correlation with said first two signals so that hydrogen-containing regions of the formation as indicated by said first two signals may be quantitatively identified as gas or liquid hydrogen-containing material.

12. The method of claim 11 wherein said first signal results from the detection of radiation consisting essentially of neutron-induced gamma radiation resulting from irradiation by said neutrons and wherein said first signal is substantially free of the influence due to the detection of thermal neutrons.

13. The method of claim 11 further including the additional step of conducting a caliper measurement of the bore hole and recording the caliper measurement in correlation with said other signal records for correlation purposes.

14. In the radioactivity well logging of earth formations traversed by a bore hole involving passing a source of neutrons through the bore hole to irradiate the formations along the bore hole and detecting radiation in the bore hole which is emitted from the formations as a result of said irradiation and providing a signal display proportional thereto, the improvement wherein radiation primarily indicative of both chlorine and hydrogen is selectively detected to provide a first signal and wherein radiation comprising the combination of a neutron-gamma component and a thermal neutron component occurring in the bore hole as a result of said irradiation whereby said radiation is primarily indicative of hydrogen to the substantial exclusion of chlorine is also selectively detected to provide a second signal and wherein said two signals are recorded in correlation with the position of the detected radiation in the bore hole in such manner that values of the two signals provide a quantitative measure of the chlorine content of the formation and provide a quantitative indication of the hydrogen content in the formation, passing a gamma radiation source through the bore hole to irradiate said formations therewith, detecting in the bore hole gamma radiation scattered by the gamma irradiated formations as a measure of the density of said formations, and recording a third signal proportional to the intensity of said scattered gamma radiation in correlation with said first two signals so that hydrogen-containing regions of the formation as indicated by said first two signals may be quantitatively identified as gas or liquid hydrogen-containing material.

15. The method of claim 14 involving passing said gamma radiation source through the bore hole concurrently with said neutron source.

16. In a system for conducting a radioactivity well log comprising a logging instrument adapted to be passed through a bore hole traversing a plurality of earth formations, said instrument including means comprising a source of neutrons for irradiating earth formations along the traverse of the bore hole, radiation detecting means quantitatively sensitive to the intensity of radiations occurring in the bore hole as a result of the irradiation of the earth formations by neutrons from said source, said detecting means including first means for deriving a first signal which varies as a function of radiation resulting from said irradiation and which varies primarily due to the presence of hydrogen to the substantial exclusion of the influence of chlorine which may also be present, said first means comprising means for selectively detecting the combination of a first radiation component resulting from said irradiation which varies in intensity due to the presence of both hydrogen and chlorine together with a predetermined quantity of a second radiation component resulting from said irradiation which varies in intensity inversely with the variations of said first radiation component due to the presence of chlorine, and second means for deriving a second signal which varies as a function of radiation resulting from said irradiation and which varies due to the presence of both hydrogen and chlorine, said second means comprising means for selectively detecting radiation resulting from said irradiation which varies in intensity due to the presence of both hydrogen and chlorine, means operatively coupled to said first means for providing a signal display which varies as a function of the combination of said first and second radiation components detected thereby and which varies primarily due to the presence of hydrogen to the substantial exclusion of the influence of chlorine which may also be present, means operatively coupled to said second means for providing a signal display which varies as a function of the intensity of the radiation detected thereby which varies due to the presence of both hydrogen and chlorine, said instrument further including a source of gamma radiation and means for detecting scattered gamma radiation scattered from adjacent earth formations as the result of irradiation by said gamma radiation source, and means operatively coupled to said scattered gamma radiation detecting means for providing a signal display which varies as a function of the intensity of the scattered gamma radiation.

References Cited by the Examiner
UNITED STATES PATENTS

| | | | |
|---|---|---|---|
| Re. 24,383 | 10/1957 | McKay | 250—71.5 |
| 2,365,763 | 12/1944 | Kalb et al. | 250—83.6 |
| 2,463,733 | 3/1949 | Albough | 250—83.6 |
| 2,508,772 | 5/1950 | Pontecorvo | 250—83.6 |
| 2,512,020 | 6/1950 | Herzog | 250—83.6 |
| 2,648,780 | 8/1953 | Herzog | 250—83.6 |
| 2,763,788 | 9/1956 | Herzog | 250—83.6 |
| 2,785,314 | 3/1957 | Grahame | 250—71.5 |
| 2,862,106 | 11/1958 | Scherbatskoy | 250—71.5 |
| 2,920,204 | 1/1960 | Youmans | 250—83.6 |
| 2,933,609 | 4/1960 | Norelius | 250—83.6 |
| 2,949,535 | 8/1960 | Scherbatskoy | 250—83.6 |
| 3,090,867 | 5/1963 | Swanson et al. | 250—83.6 X |

RALPH G. NILSON, *Primary Examiner.*

ARTHUR GAUSS, *Examiner.*